Figure 1:
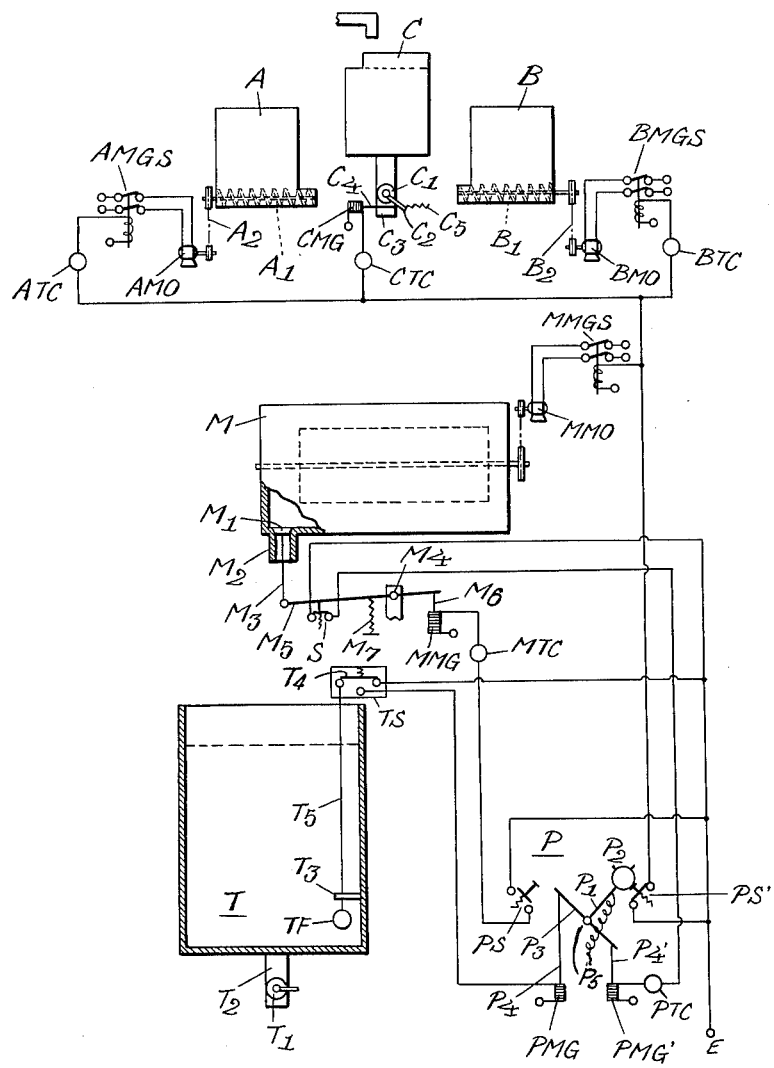

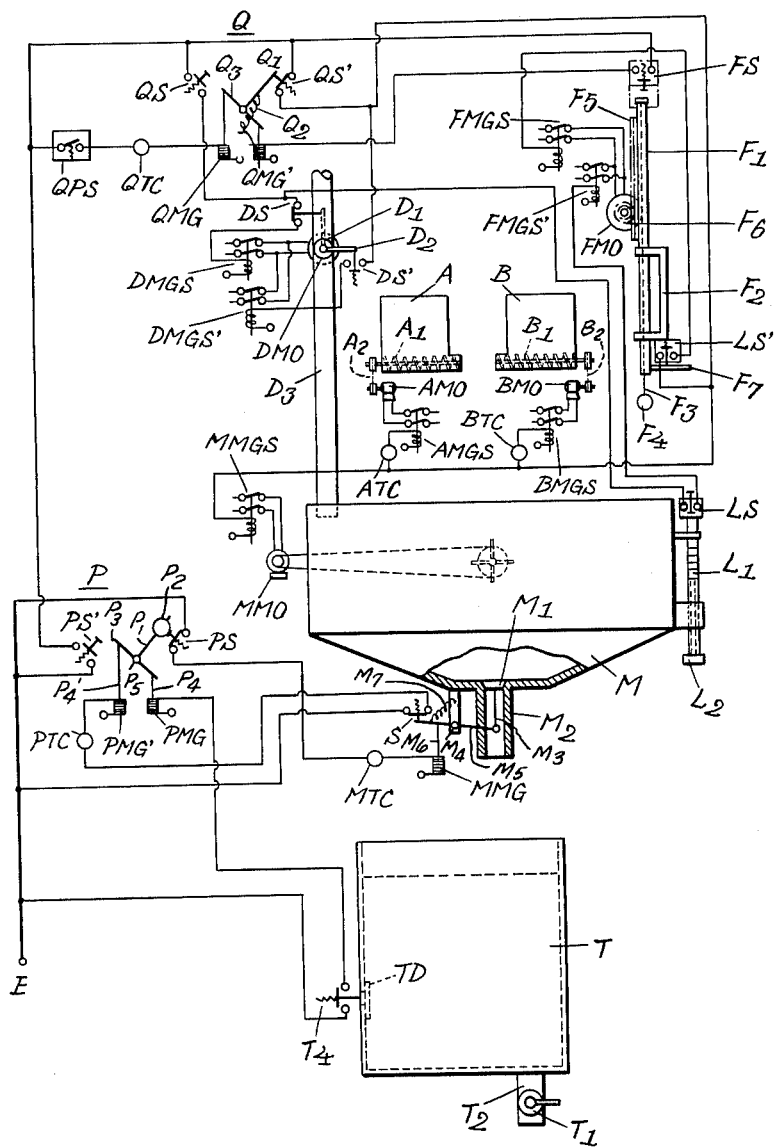

United States Patent Office 3,224,738
Patented Dec. 21, 1965

3,224,738
APPARATUS FOR AUTOMATICALLY MIXING
SEVERAL KINDS OF STOCK-MATERIALS
Tomiji Tarukawa, 51 Higashiyamacho Itabashiku,
Tokyo, Japan
Filed Sept. 14, 1960, Ser. No. 56,006
Claims priority, application Japan, Sept. 21, 1959,
34/30,146
2 Claims. (Cl. 259—2)

The present invention relates to apparatus for automatically mixing several kinds of stock-materials in which predetermined quantities of several kinds of materials can be automatically mixed.

It is an object of the present invention to provide a simply constructed apparatus for automatically mixing several kinds of stock-materials wherein predetermined quantities of several kinds of materials are automatically and successively fed and mixed and then a mixture is discharged.

Another object of the present invention is to provide an automatic mixing apparatus wherein discharge from feeding devices to a mixer is effected after a mixture has been completely discharged from said mixer which has been prepared to receive the materials and said feeding devices have been prepared to discharge the materials.

Still another object of the present invention is to provide an automatic mixing apparatus wherein a feeding device is selectively operative and inoperative in response to a decrease or an increase in the level of a mixture in an accumulator.

The above and other objects and advantages of the present invention will be apparent from the hereinfollowing description of preferred embodiments of the invention which are schematically shown by way of example in the accompanying drawing, throughout the figures of which the same reference characters have been employed to denote identical parts.

In the drawing:

FIGURE 1 schematically shows a first embodiment of mixing apparatus according to the present invention, and FIGURE 2 schematically shows a second embodiment of mixing apparatus according to the invention.

Referring to FIGURE 1, A and B are predetermined quantity feeding devices for feeding several kinds of materials to be mixed in response to a mixing ratio thereof and A1 and B1 are discharge means in said feeding devices, for example, screw conveyors which are driven through belts A2 and B2 by motors AMO and BMO respectively. AMGS and BMGS are electromagnetic switches which operate to open and close circuits of the motors AMO and BMO respectively. ATC and BTC are time limit switches which are inserted into circuits of said electromagnetic switches AMGS and BMGS, and are set to be opened after operating for a predetermined time to thereby operate said discharge means A1 and B1 so as to supply predetermined quantities of materials from said feeding devices A and B respectively. C is a feeding device for liquid only comprised of a tank of the overflow type so that a predetermined quantity of liquid is always stored therein. C1 is a discharge valve with an arm C2, which is provided in a discharge pipe C3. One side of said arm C2 is connected by a wire C4 with an armature of an electromagnet CMG for opening said discharge valve C1 and the other side is connected with a spring C5 for closing said discharge valve C1 which is closed by the force of the spring C5 at the same time as the demagnetization of said electromagnet CMG. In the shown state the valve is closed. CTC is a time limit switch which operates like the time limit switch ATC or BTC. M is a mixer in which a mixing means (shown by the dotted line) is driven by a motor MMO through a belt or the like. MMGS is an electromagnetic switch for opening and closing a circuit of the motor MMO. A valve M1 is provided in a discharge pipe M2, a valve rod M3 is connected with one arm of a lever M5 with a fulcrum M4 and the other arm of said lever is connected through a wire M6 with an armature of an electromagnet MMG. On the other arm of said lever is provided a spring M7 and thereby the discharge pipe M2 is closed by the valve M1 through the lever M5 and valve rod M3 when the electromagnet MMG is demagnetized. S is a switch which is adapted to be closed upon closing of the valve M1 by the lever M5 and in its operation the mixer can receive the materials. P1 is a rod of a change-over device P, to which rod is attached a weight P2. Both ends of the other rod P3 are respectively connected through wires P4 and P4' with armatures of electromagnets PMG and PMG' for turning the rod P1. P5 is a pivotal shaft of the rod P1, and PS and PS' are change-over switches which are arranged at extreme turned positions of the weight P2, each being adapted to be closed by being contacted by the weight P2. MTC and PTC are time limit switches, the former controlling an exciting time of the electromagnet MMG for complete discharge of the mixture from the mixer and the latter controlling that of the electromagnet PMG' for turning the change-over device P. Under said mixer M is provided a mixture accumulator T the bottom of which is provided with a discharge pipe T2 with a discharge valve T1. In the tank T there is arranged a float TF connected by a wire T5 passing through a guide piece T3 with a push member T4 for a limit switch TS. E is an electric source.

The operation of the apparatus is as follows.

When the mixture level in the tank T is lowered and the tank becomes empty the switch TS is closed to complete the following circuit:

E–TS–PMG–

Accordingly the electromagnet PMG is excited so that the wire P4 is pulled so as to turn the weight P2 to the switch PS side. Consequently the switch PS is closed and the following circuit is closed:

E–PS–MTC–MMG–

Accordingly the electromagnet MMG is excited so that the wire M6 is pulled so as to lift the valve M1 through the lever M5 to open the discharge pipe M2 and then feed the mixture into the tank T. When the mixer M becomes empty the time limit switch MTC within the circuit operates to demagnetize the electromagnet MMG so that the valve M1 closes the discharge pipe M2 by the force of the spring M7 through the lever M5. At the same time the switch S is closed so that the following circuit is closed:

E–S–PTC–PMG'–

Therefore the electromagnet PMG' is excited so that the wire P4' is pulled so as to turn the weight P2 to the switch PS' side. Consequently the switch PS' is closed so that current passes through the following circuits:

E–PS'–ATC–AMGS–
E–PS'–BTC–BMGS–
E–PS'–CTC–CMG–
E–PS'–MMGS

Accordingly the electromagnetic switches AMGS and BMGS and the electromagnet CMG are simultaneously excited so that by the electromagnetic switches AMGS and BMGS the motors AMO and BMO are rotated to feed the powdery materials through the screw conveyors A1 and B1 into the mixer M which is driven by the motor MMO through the electromagnetic switch MMGS and by the electromagnet CMG the arm C2 of the discharge valve C1 is rotated to open the valve C1 to discharge liquid into the mixer M. Necessary periods of times excited by said electromagnetic switches and said electromagnet are obtained by the time limit switches ATC, BTC and CTC. Consequently by demagnetization of the electromagnet switches AMGS and BMGS the motors AMO and BMO are stopped to stop the feeding of the materials from the feeding devices A and B, and by demagnetization of the electromagnet CMG the arm C2 is turned by the force of the spring C5 to close the discharge valve C1 so that the feeding of the materials is stopped. Thus various materials are fed during predetermined periods of times from the feeding devices into the mixer M and are mixed in the mixer. After the materials to be mixed have been mixed the time limit switch PTC operates to demagnetize the electromagnet PMG'. When the discharge valve T1 is opened at any time and the mixture in the tank T is discharged, the level of the mixture becomes lowered and the switch TS is closed. Thus, feeding of the materials, mixing and feeding to the accumulator are effected.

In FIGURE 2 is shown a state in which a predetermined quantity of liquid is measured in the mixer M by a float device, at which time predetermined quantities of powdery materials are then supplied, mixed and discharged. A valve D1, mounted on the discharge pipe D3, is connected with a reversible motor DMO which operates to open and close valve D1. DS and DS' are limit switches which are arranged at the extreme positions of an arm D2 of said valve and are adjusted to be closed only upon release from said arm. Thus, when the limit switch DS is closed the valve D1 is closed, and when the limit switch DS' is closed the valve D1 is opened. Electromagnetic switches DMGS and DMGS' are operative to drive the said motor DMO in respectively opposite directions. Q1 is a rod in a change-over device Q for limit switches QS and QS', which rod is provided with a spring Q2. Another rod Q3 of the change-over device Q is connected at both ends with armatures of electromagnets QMG and QMG' through respective wires. Said limit switches QS and QS' are arranged at the positions controlled by the rod Q1 of the change-over device and are closed only when contacted and displaced by rod Q1. F1 is a vertically movable tube which is loosely fitted in a frame F2 and into which is inserted a rod F3 supporting a float F4 so as to be movable upwardly and downwardly. On a side of said tube is provided a rack F5 which meshes with a pinion F6. A rotary shaft of said pinion F6 is connected with that of a reversible reduction motor FMO for vertically moving the tube F1. Electromagnetic switches FMGS and FMGS' operate to drive the motor FMO in respectively opposite directions. The rod F3 is supported at its upper end by the rod F3. FS is a switch which is arranged above the tube F1 and is closed only when contacted and displaced by tube F1. LS and LS' are limit switches which operate to control the vertical movement of the tube F1 by means of a push rod F7 attached to the tube F1 and are respectively mounted at suitable positions on the outer side of the mixer M and the lower end of the frame F2 and thereby are closed only when released. A time limit switch QTC is set to demagnetize an electromagnet QMG after it has been excited for a particular time period. When the rod Q1 of the change-over device is turned to the side of the limit switch QS by excitation of the electromagnet QMG, the electromagnet QMG is demagnetized by the time limit switch QTC, but the limit switch QS' is opened and the limit switch QS is closed. Thus the electric circuit:

E–PS'–QS–DS–DMGS– is closed so that the electromagnetic switch DMGS is excited and thereby the motor DMO is normally rotated to open the valve D1. In this case the switch DS' is released by the turning of the rod D2, the switch DS' being pushed to be opened and the rotation of the motor DMO is stopped by demagnetization of the electromagnetic switch DMGS. Thus, the valve D1 is opened to start feeding of the liquid. At the same time as said electromagnetic switch DMGS is excited, the following circuit is closed:

E–PS'–QS–LS–FMGS'–

Thereby the electromagnetic switch FMGS' is excited and the motor FMO rotates normally. The pinion F6 mounted on the shaft of said motor FMO is rotated to lower the tube F1 by the rack F5 meshing with said pinion F6. Then the switch LS' is released from contact of the push rod F7 and closed. Further the tube F1 is lowered and the switch LS is pressed by the push rod F7 to be opened so that the circuit of the electromagnetic switch FMGS' is opened to stop the rotation of the motor FMO. As the tube F1 is lowered, the float F4 is lowered and is stopped at a predetermined position in the mixer M. On the other hand, as the liquid level in the mixer M rises gradually, the float F4 also rises accordingly, and the switch FS becomes pushed to be closed and the following circuit is completed:

E–PS'–FS–QMG'–

Accordingly the electromagnet QMG' is excited and turns the rod Q1 to the limit switch QS' side so that the limit switch QS is opened, the limit switch QS' is closed and the following circuit is completed:

E–PS'–QS'–DMGS'–

Consequently the electromagnetic switch DMGS' is excited to reversely rotate the motor DMO. Thus, the valve D1 is closed, the rod D2 pushes and opens the switch DS' so that the electromagnetic switch DMGS' is demagnetized to stop the rotation of the motor DMO. Accordingly the feeding of the liquid is stopped. Thus a predetermined quantity of the liquid is stored in the mixer M. At the same time as said electromagnetic switch DMGS' is excited the following circuits are completed:

E–PS'–QS'–BTC–BMGS–
E–PS'–QS'–ATC–AMGS–

Consequently the electromagnetic switches BMGS and AMGS are excited to rotate the motors BMO and AMO respectively and the materials in the storage tanks B and A are fed through the feeding openings respectively into the mixer M in operation by the screw conveyors B1 and A1. The time limit switches BTC and ATC are opened after they operate for given times so that the electromagnetic switches BMGS and AMGS are demagnetized to stop the rotation of the motors BMO and AMO respectively and the supply of predetermined quantities of the materials are effected. The following circuit is simultaneously completed:

E–PS'–QS'–LS'–FMGS–

Thus, the electromagnetic switch FMGS is excited to reverse the motor FMO so that the tube F1 is lifted contrary to the above case. The switch LS is closed by the release of the push rod F7 but this circuit is not completed because the limit switch QS is kept in its open state. As the tube F1 rises, the push rod F7 pushes and opens the switch LS' and the electromagnetic switch FMGS is demagnetized to stop the rotation of the motor FMO. The tube F1 is stopped at such a given position on the outside of the mixer M that mixing of the materials in said mixer can be effected easily.

In the case where a powdery material is fed first, instead of the float device, a responsive device such as a membranous member may be employed. In the case that liquid is not supplied but only powdery materials are fed, a switch QPS may be provided in front of a time switch QTC. If the switch QPS is kept open, the rod Q1 of the change-over device remains in the position whereby QS' is closed, and the switch DS' remains in the open state so that the valve D1 is not operated to be opened and thus only the feeding devices for powderly materials are operated.

The operations of mixing, discharging and storing can be effected in the same manner as that in the case of FIGURE 1.

TD is a pressure responsive element which operates to open switch T4 under pressure and to close it when the mixture level in accumulator T is lowered and doesn't exert sufficient pressure on said element. The relation of the element TD and the switch T4 is similar to that of the float TF and the switch TS as shown in FIG. 1.

Numerous modifications and variations of the disclosed embodiments will become apparent to those skilled in the art without departing from the scope and spirit of the invention as defined in the attached claims.

What is claimed is:

1. Apparatus for automatically mixing several kinds of materials which apparatus comprises: a plurality of feeding devices for feeding predetermined quantities of the materials to be mixed, said predetermined quantities being selected so as to obtain a preestablished mixture, each of said feeding devices including a discharge device for discharging only a predetermined quantity of the material from each device, a mixer adapted for receiving and mixing the materials discharged from said feeding devices, the mixer including a discharge device, said discharge device having a first operative position in which materials from the feeding devices can be received by the mixer to thereby fill said mixer and a second operative position in which mixed material can be discharged from the mixer, an accumulator operatively positioned relative to said mixer for receiving mixed material which is discharged from said mixer, means operative in response to said first position of the discharge device of the mixer subsequent to discharge of the contents in the mixer into the accumulator, said means controlling the feeding of the material from the feeding devices to the mixer and the mixing of the material in the mixer, and a sensing device operative in response to decrease of a predetermined quantity of material in the accumulator, the mixture from the mixer to the accumulator being fed upon operation of said sensing device.

2. Apparatus according to claim 1, wherein said means includes a changeover device for controlling feeding and discharge of each of said feeding devices, the change-over device comprising a first actuating switch and a second actuating switch operatively connected so that one of the switches is operative with the other inoperative.

References Cited by the Examiner
UNITED STATES PATENTS 2,858,594 11/1958 Eirich et al. _____ 259—163 X
2,930,595 3/1960 Tarukawa _____ 259—2

WALTER A. SCHEEL, *Primary Examiner.*

H. L. MARTIN, LEO QUACKENBUSH, *Examiners.*